(12) United States Patent
Goel et al.

(10) Patent No.: US 11,561,015 B2
(45) Date of Patent: Jan. 24, 2023

(54) PREVENTING EVAPORATOR COIL FREEZE DURING RE-HEAT DEHUMIDIFICATION

(71) Applicant: Lennox Industries Inc., Richardson, TX (US)

(72) Inventors: Rakesh Goel, Irving, TX (US); Siddarth Rajan, Addison, TX (US)

(73) Assignee: Lennox Industries Inc., Richardson, TX (US)

(*) Notice: Subject to any disclaimer, the term of this patent is extended or adjusted under 35 U.S.C. 154(b) by 113 days.

(21) Appl. No.: 17/181,174

(22) Filed: Feb. 22, 2021

(65) Prior Publication Data

US 2022/0268456 A1  Aug. 25, 2022

(51) Int. Cl.
| | |
|---|---|
| *F24F 3/14* | (2006.01) |
| *F25B 47/00* | (2006.01) |
| *G05B 15/02* | (2006.01) |
| *F24F 3/153* | (2006.01) |

(52) U.S. Cl.
CPC ............ *F24F 3/1405* (2013.01); *F24F 3/153* (2013.01); *F25B 47/006* (2013.01); *G05B 15/02* (2013.01); *F24F 2003/144* (2013.01)

(58) Field of Classification Search
None
See application file for complete search history.

(56) References Cited

U.S. PATENT DOCUMENTS

| | | | | |
|---|---|---|---|---|
| 4,189,929 A | | 2/1980 | Russell | |
| 4,825,662 A | | 5/1989 | Alsenz | |
| 5,062,276 A | * | 11/1991 | Dudley | G05D 22/02 62/176.6 |
| 5,628,201 A | * | 5/1997 | Bahel | F25B 13/00 62/211 |
| 7,975,495 B2 | * | 7/2011 | Voorhis | F24F 3/153 62/181 |
| 9,772,124 B2 | * | 9/2017 | Wintemute | F25B 47/025 |
| 10,066,860 B2 | * | 9/2018 | Downie | F24F 3/153 |
| 10,295,217 B2 | * | 5/2019 | Goel | F24F 11/72 |
| 10,386,089 B2 | * | 8/2019 | Goel | F24F 3/044 |
| 2010/0082161 A1 | * | 4/2010 | Patch | F24F 11/30 236/49.3 |
| 2013/0014521 A1 | | 1/2013 | Lukasse et al. | |
| 2014/0260368 A1 | * | 9/2014 | Wintemute | F25B 49/022 62/89 |
| 2015/0285526 A1 | | 10/2015 | Smith et al. | |

(Continued)

*Primary Examiner* — Mohammad Ali
*Assistant Examiner* — Kelvin Booker
(74) *Attorney, Agent, or Firm* — Shackelford, Bowen, McKinley & Norton, LLP

(57) ABSTRACT

In an embodiment, a method of preventing evaporator coil freeze in a heating, ventilation and air conditioning (HVAC) system includes determining a reference saturated suction temperate (SST) via a sensor disposed in relation to an evaporator coil in the HVAC system, where the HVAC; system is operating in reheat dehumidification mode. The method also includes determining whether the reference SST is below a minimum SST threshold. The method also includes, responsive to a determination that the reference SST is below the minimum SST threshold, determining a decreased compressor speed. The method also includes modulating a variable-speed compressor in the HVAC system in correspondence to the decreased compressor speed.

16 Claims, 7 Drawing Sheets

(56) References Cited

U.S. PATENT DOCUMENTS

| | | | |
|---|---|---|---|
| 2015/0337831 A1* | 11/2015 | Zhou | F24F 11/62 |
| | | | 700/282 |
| 2016/0273815 A1* | 9/2016 | Downie | F25B 49/02 |
| 2016/0327323 A1 | 11/2016 | Goel | |
| 2017/0010032 A1 | 1/2017 | Goel et al. | |
| 2017/0153037 A1* | 6/2017 | Goel | F24F 3/1405 |
| 2017/0227246 A1* | 8/2017 | Rajan | F25B 49/022 |
| 2017/0234564 A1* | 8/2017 | Goel | F24F 11/77 |
| | | | 62/93 |
| 2017/0356668 A1* | 12/2017 | Goel | F24F 11/77 |
| 2017/0356671 A1* | 12/2017 | Goel | F24F 11/72 |
| 2018/0372359 A1* | 12/2018 | Goel | F24F 11/76 |
| 2019/0277533 A1 | 9/2019 | Goel et al. | |
| 2019/0323722 A1* | 10/2019 | Goel | F24F 1/0003 |
| 2020/0096236 A1 | 3/2020 | Rajan et al. | |
| 2020/0173683 A1 | 6/2020 | Goel et al. | |
| 2020/0240692 A1* | 7/2020 | Gokhale | F25B 13/00 |
| 2020/0355418 A1* | 11/2020 | Najafifard | A47F 3/0478 |
| 2022/0186996 A1 | 6/2022 | Goel et al. | |

\* cited by examiner

PREVENTING EVAPORATOR COIL FREEZE DURING RE-HEAT DEHUMIDIFICATION

TECHNICAL FIELD

The present disclosure relates generally to heating, ventilation, and air conditioning (HVAC) systems and more particularly, but not by way of limitation, to control systems and methods for preventing evaporator coil freeze during re-heat dehumidification.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of preventing evaporator coil freeze in a heating, ventilation and air conditioning (HVAC) system. The method includes determining a reference saturated suction temperate (SST) via a sensor disposed in relation to an evaporator coil in the HVAC system, where the HVAC system is operating in reheat dehumidification mode. The method also includes determining whether the reference SST is below a minimum SST threshold. The method also includes, responsive to a determination that the reference SST is below the minimum SST threshold, determining a decreased compressor speed. The method also includes modulating a variable-speed compressor in the HVAC system in correspondence to the decreased compressor speed. Other embodiments of this aspect include corresponding computer systems, apparatus, and computer programs recorded on one or more computer storage devices, each configured to perform the actions of the method.

In an embodiment, another general aspect includes a heating, ventilation and air conditioning (HVAC) system. The HVAC system includes an evaporator coil, a re-heat coil, a condenser coil and a sensor disposed in relation to the evaporator coil. The HVAC system also includes a compressor fluidly coupled to the condenser coil, the evaporator coil and the re-heat coil. The HVAC system also includes a controller operatively coupled to the compressor, where the controller is operable to perform a method. The method includes determining a reference saturated suction temperate (SST) via a sensor disposed in relation to an evaporator coil in the HVAC system, where the HVAC system is operating in reheat dehumidification mode. The method also includes determining whether the reference SST is below a minimum SST threshold. The method also includes, responsive to a determination that the reference SST is below the minimum SST threshold, determining a decreased compressor speed. The method also includes modulating a variable-speed compressor in the HVAC system in correspondence to the decreased compressor speed.

In an embodiment, another general aspect includes a computer-program product that further includes a non-transitory computer-usable medium having computer-readable program code embodied therein. The computer-readable program code is adapted to be executed to implement a method. The method includes determining a reference saturated suction temperate (SST) via a sensor disposed in relation to an evaporator coil in the HVAC system, where the HVAC system is operating in reheat dehumidification mode. The method also includes determining whether the reference SST is below a minimum SST threshold. The method also includes, responsive to a determination that the reference SST is below the minimum SST threshold, determining a decreased compressor speed. The method also includes modulating a variable-speed compressor in the HVAC system in correspondence to the decreased compressor speed.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
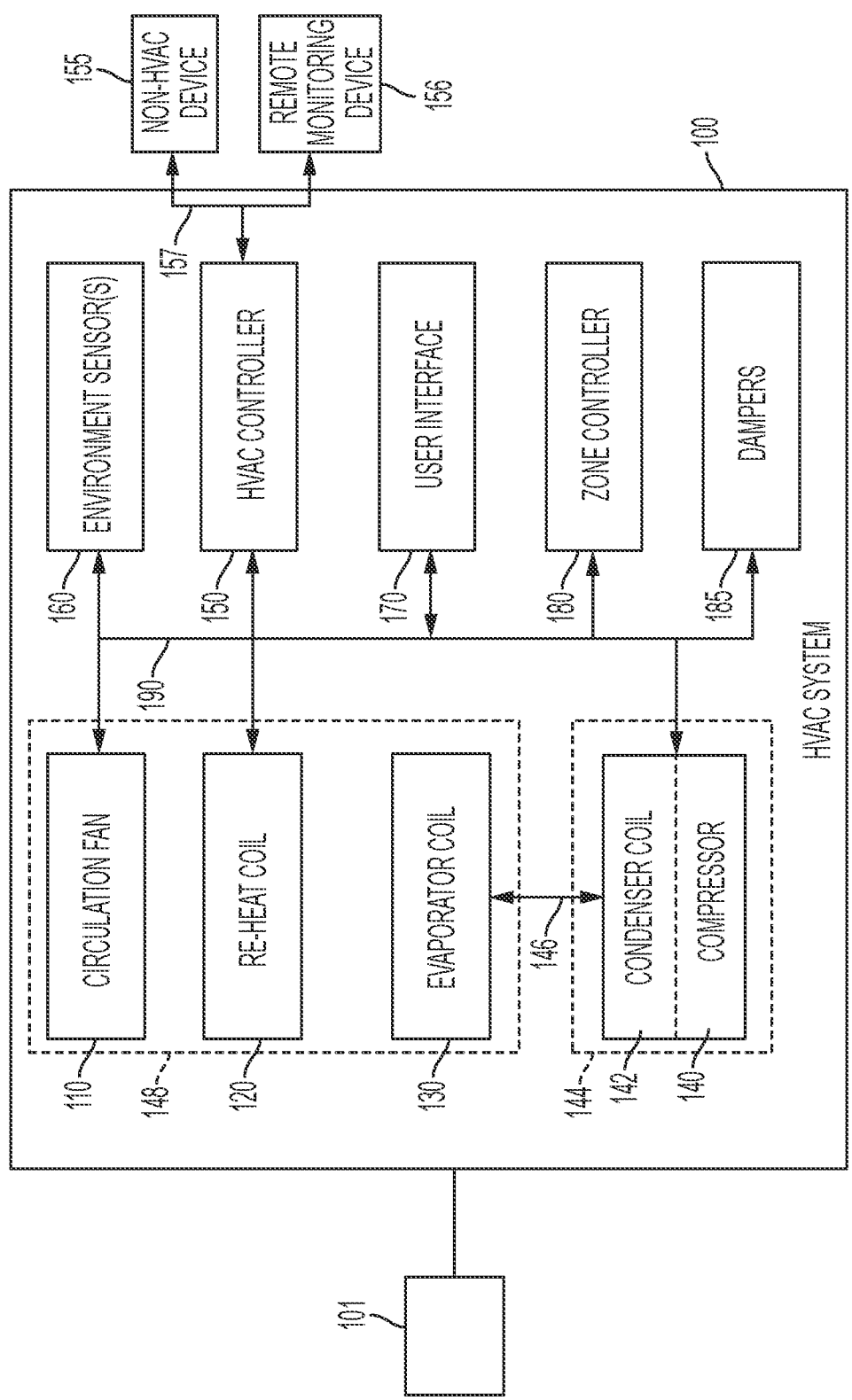
FIG. 1 is a block diagram of an illustrative HVAC system.

Various embodiments of the present disclosure will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions.

Sensible cooling load refers to an amount of heat that must be removed from the enclosed space to accomplish a desired temperature change of the air within the enclosed space. The sensible cooling load is reflected by a temperature within the enclosed space as read, for example, on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read, for example, on a wet-bulb thermometer. Setpoint or temperature setpoint refers to a target temperature setting of the HVAC system as set by a user or automatically based on a pre-defined schedule. Discharge air temperature (DAT) refers to a temperature of air leaving an evaporator coil. Typically, DAT is maintained at a constant pre-set level. DAT varies with indoor dry-bulb air temperature, indoor wet-bulb air temperature, indoor air flow rate, cooling capacity of the HVAC system, and other design parameters.

When there is a high sensible cooling load such as, for example, when outside-air temperature is significantly warmer than an inside-air temperature setpoint, the HVAC system will continue to operate in an effort to effectively cool and dehumidify the conditioned air. Such operation is commonly referred to as "cooling mode." When there is a low sensible cooling load but high relative humidity such as, for example, when the outside air temperature is relatively close to the inside air temperature setpoint, but the outside air is considerably more humid than the inside air, additional steps must be undertaken to increase the moisture-removal capability of the HVAC system to avoid occupant discomfort.

One approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort.

Another air dehumidification approach involves re-heating of air leaving an evaporator coil. This approach typically involves directing refrigerant from the compressor to a re-heat coil positioned adjacent to the evaporator coil. The re-heat coil transfers some heat energy from the refrigerant to the air leaving the evaporator thereby raising the temperature of air leaving the evaporator and lowering the temperature of the refrigerant before the refrigerant moves to the condenser. Such operation is commonly referred to as "re-heat dehumidification mode."

While re-heat dehumidification mode can improve occupant comfort as compared to lowering the temperate setpoint, it presents challenges with respect to saturation suction temperature. Saturation suction temperature (SST) refers to saturated refrigerant temperature at suction pressure leaving an evaporator, or any measurement used as a proxy for such temperature. If the SST approaches a freezing point of the refrigerant, frost will begin to form on the evaporator coil. This situation is often referred to as evaporator coil freeze. Evaporator coil freeze causes an increased risk of damage to the evaporator coil and other components of the HVAC system. This problem can be particularly common in HVAC systems that include more than compressor, as the presence of multiple circuits in the evaporator coil, some of which are more downstream than others, can result in wide variation in SST throughout the evaporator coil.

The present disclosure recognizes that SST is not necessarily impacted the same way in re-heat dehumidification mode as it is in cooling mode. Table 1 below illustrates three example scenarios for an example HVAC system. In the first example scenario, the example HVAC system is in cooling mode with a refrigerant charge of 16 pounds. In the second example scenario, the example HVAC system is in re-heat dehumidification mode with the same refrigerant charge of 16 pounds. In the third example scenario, the example HVAC system is again in re-heat dehumidification mode but with a refrigerant charge of 20 pounds. For illustrative purposes, the refrigerant is assumed to be R-410A, although any number of other refrigerants could be substituted.

With reference to the first example scenario shown in Table 1, the example HVAC system performs appropriately in cooling mode with the refrigerant charge of 16 pounds. However, with reference to the second example scenario, the example HVAC system performs comparatively poorly in re-heat dehumidification mode with the same refrigerant charge of 16 pounds. More specifically, in the second example scenario, the example HVAC system exhibits lower latent capacity, higher superheat (i.e., 41° F. of superheat), and lower suction pressure. This lower suction pressure corresponds to an SST of approximately 34° F. and thus presents increased risk of evaporator coil freeze. However, in the third scenario, the example HVAC system performs appropriately in re-heat dehumidification mode with an additional four pounds of refrigerant.

TABLE 1

|  | Example Scenario 1: Cooling Mode with Refrigerant Charge of 16 pounds | Example Scenario 2: Re-heat dehumidification mode with Refrigerant Charge of 16 pounds | Example Scenario 3: Cooling Mode with Refrigerant Charge of 20 pounds |
| --- | --- | --- | --- |
| Refrigerant Charge (LBS) | 16 | 16 | 20 |
| Standard CFM | 1,750 | 1,751 | 1,750 |
| Suction Pressure (PSIG) | 139 | 106 | 137 |
| Total Capacity (BTU/HR) | 60,000 | 14,453 | 24,325 |

TABLE 1-continued

|  | Example Scenario 1: Cooling Mode with Refrigerant Charge of 16 pounds | Example Scenario 2: Re-heat dehumidification mode with Refrigerant Charge of 16 pounds | Example Scenario 3: Cooling Mode with Refrigerant Charge of 20 pounds |
|---|---|---|---|
| Sensible Capacity (BTU/HR) | 41,000 | 2,516 | 5,086 |
| Latent Capacity (BTU/HR) | 19,000 | 11,937 | 19,239 |
| S/T Ratio | 0.68 | 0.17 | 0.21 |
| Subcooling (° F.) | 7 | 0 | 2 |
| Superheat (° F.) | 11 | 41 | 15 |

The present disclosure recognizes that HVAC systems are often undercharged in accordance with the first and second example scenarios discussed above relative to Table 1, such that performance is acceptable in cooling mode but unacceptable in re-heat dehumidification mode. Due this factor and other factors, such as SST variance throughout multi-compressor systems, re-heat dehumidification mode can present a significant risk of evaporator coil freeze. Furthermore, since re-heat dehumidification mode operates by re-heating air leaving the evaporator coil, control methods based on DAT are typically ineffective when HVAC systems are operating in this mode.

The present disclosure describes examples of reducing a risk of evaporator coil freeze using control systems and methods that are effective, for example, in re-heat dehumidification mode. In various embodiments, a controller of an HVAC system monitors SST and causes a compressor speed of a variable-speed compressor to be algorithmically adjusted, or modulated, based, at least in part, on the SST. For example, the compressor speed can be algorithmically decreased as the SST falls beneath a configurable minimum temperature, or whenever the SST indicates a trend towards evaporator coil freeze. Afterwards, the compressor speed can be algorithmically increased towards its previous level as the SST moves toward or exceeds the configurable minimum temperature, or whenever the SST indicates a trend away from evaporator coil freeze. Examples will be described below with reference to the Drawings.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101. In a typical embodiment, the enclosed space 101 is, for example, a house, an office building, a warehouse, and the like. Thus, the HVAC system 100 can be a residential system or a commercial system such as, for example, a roof top system. For illustration, the HVAC system 100 as illustrated in FIG. 1 includes various components; however, in other embodiments, the HVAC system 100 may include additional components that are not it but typically included within HVAC systems.

The HVAC system 100 includes a variable-speed circulation fan 110, a re-heat coil 120 associated with the variable-speed circulation fan 110, typically, and a refrigerant evaporator coil 130, also typically associated with the variable-speed circulation fan 110. The variable-speed circulation fan 110, the re-heat coil 120, and the refrigerant evaporator coil 130 are collectively referred to as an "indoor unit" 148. In a typical embodiment, the indoor unit 148 is located within, or in close proximity to, the enclosed space 101. The HVAC system 100 also includes a variable-speed compressor 140 and an associated condenser coil 142, which are typically referred to as an "outdoor unit" 144. In various embodiments, the outdoor unit 144 is, for example, a rooftop unit or a ground-level unit. The variable-speed compressor 140 and the associated condenser coil 142 are connected to an associated evaporator coil 130 by a refrigerant line 146. In a typical embodiment, the variable-speed compressor 140 is, for example, a single-stage compressor, a multi-stage compressor, a single-speed compressor, or a variable-speed compressor. The variable-speed circulation fan 110, sometimes referred to as a blower, is configured to operate at different capacities (i.e., variable motor speeds) to circulate air through the HVAC system 100, whereby the circulated air is conditioned and supplied to the enclosed space 101.

Figure 3:
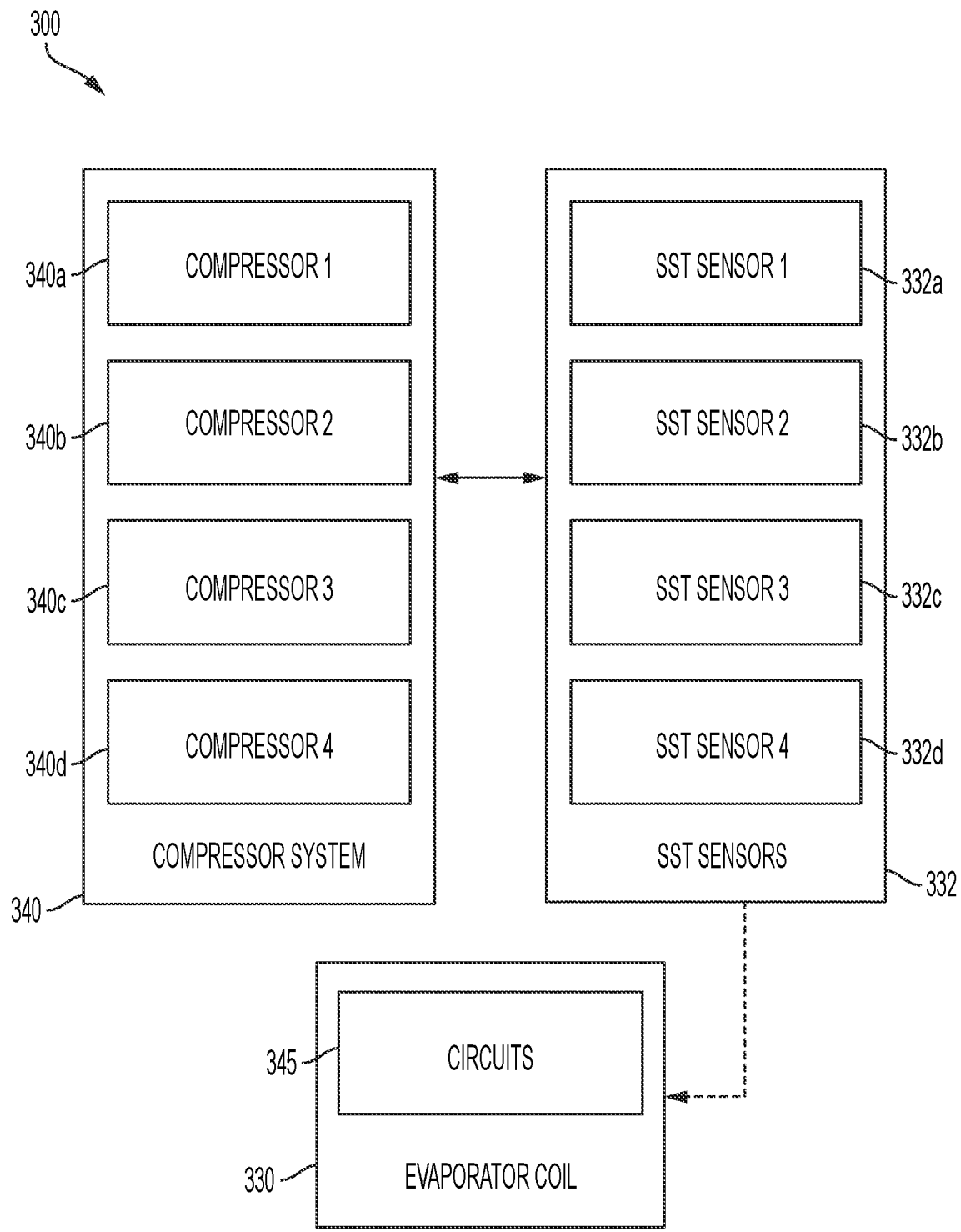
FIG. 3 illustrates an example implementation involving multiple compressors.

In various embodiments, as described in greater relative to FIG. 3, the variable-speed compressor 140 may be representative of a compressor system including multiple compressors of the same or different capacities, one or more of which may be variable-speed compressors. In these embodiments, such compressors may include any appropriate arrangement of compressors (e.g., in series and/or in parallel). In some of these embodiments, such compressors may operate in tandem and share discharge lines and suction lines. In addition, or alternatively, such compressors may be independently operable in some implementations. For example, a first compressor may be allowed to operate and a second compressor may be restricted from operation. Compressor operations may include full-load operations and part-load operations. A full-load operation may include operation of each compressor. A part-load operation may include allowing operation of one or more compressors and restricting operation of one or more other compressors. In some implementations, a part-load operation may include operation of a multistage compressor at one of the low settings (e.g., when a compressor includes a high setting and at least one low setting).

In embodiments in which the variable-speed compressor 140 is representative of multiple compressors, the evaporator coil 130 may include a plurality of evaporator circuits that are apportioned among the compressors according to a suitable circuiting arrangement, where each compressor operates off of the evaporator circuits apportioned thereto. For example, in various embodiments, the evaporator coil 130 may implement a row-split or intertwined circuiting arrangement. Although the variable-speed compressor 140 can be representative of multiple compressors as described above, for simplicity of description and illustration, the variable-speed compressor 140 will be illustrated and described singly.

Still referring to FIG. 1, the HVAC system 100 includes an HVAC controller 150 that is configured to control operation of the various components of the HVAC system 100 such as, for example, the variable-speed circulation fan 110, the re-heat coil 120, and the variable-speed compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101. In a typical embodiment, the HVAC controller 150 also includes a processor and a memory to direct operation of the HVAC system 100 including, for example, a speed of the variable-speed circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In a typical embodiment, the HVAC system 100 is configured to communicate with a plurality of devices such as, for example, a communication device 155, a monitoring device 156, and the like. In a typical embodiment, the monitoring device 156 is not pail of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the evaporator coil 130 and the re-heat coil 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the variable-speed circulation fan 110, the variable-speed compressor 140, or the plurality of environment sensors 160.

Figure 2A:
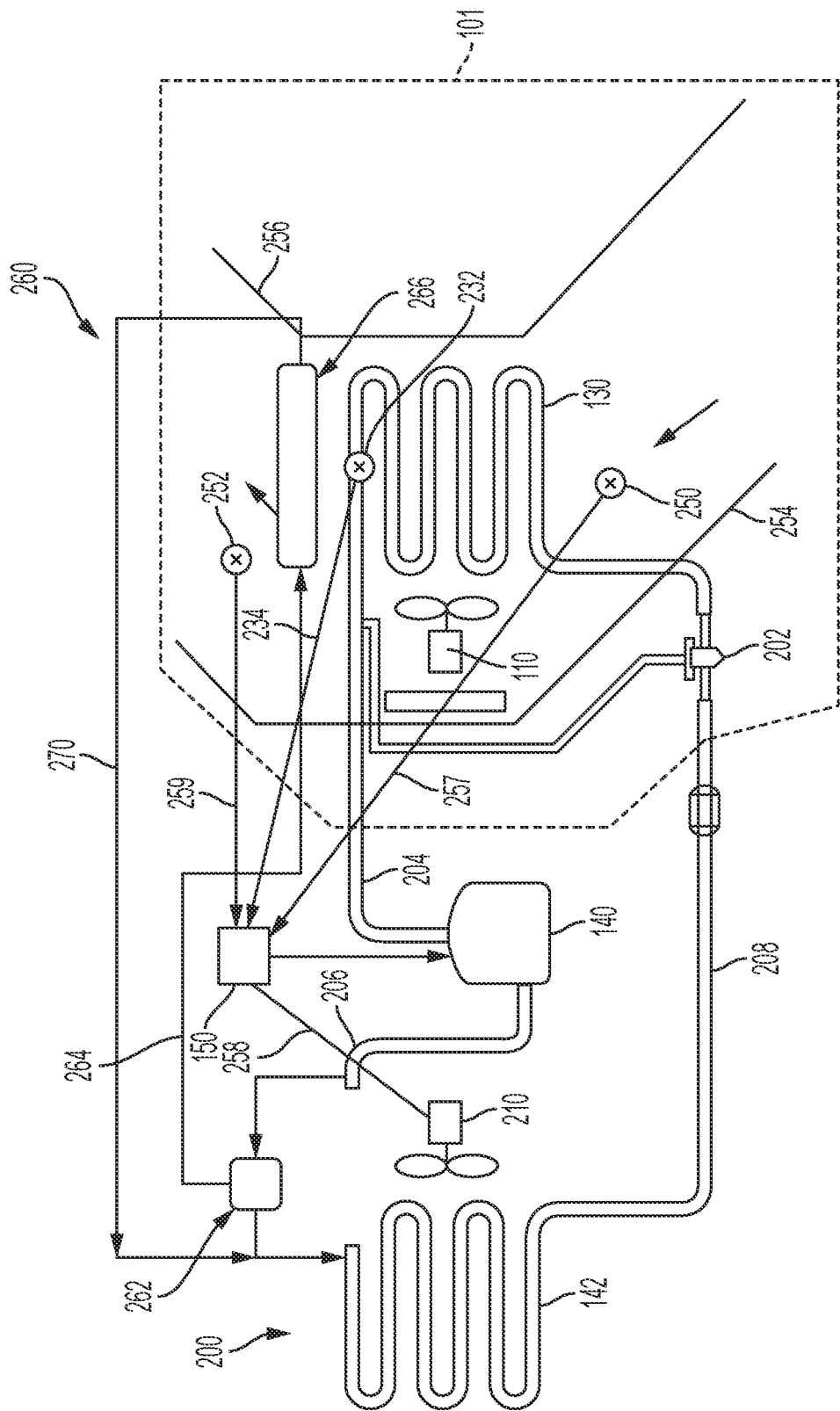
FIG. 2A is a schematic diagram of a package HVAC system having a re-heat loop.

FIG. 2A is a schematic diagram of a package HVAC system 200 having a re-heat loop 260. The package HVAC system 200 includes the refrigerant evaporator coil 130, the condenser coil 142, the compressor 140, and a metering device 202. In a typical embodiment, the metering device 202 is, for example, a thermostatic expansion valve or a throttling valve. The refrigerant evaporator coil 130 is fluidly coupled to the compressor 140 via a suction line 204. The compressor 140 is fluidly coupled to the condenser coil 142 via a discharge line 206. The condenser coil 142 is fluidly coupled to the metering device 202 via a liquid line 208.

Still referring to FIG. 2A, during operation, low-pressure, low-temperature refrigerant is circulated through the refrigerant evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the refrigerant evaporator coil 130 by the circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the compressor 140 via the suction line 204. In a typical embodiment, the compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant enters a three-way valve 262 where at least a portion of the high-pressure, high-temperature, superheated vapor refrigerant is diverted into a re-heat feed line 264. The re-heat feed line 264 directs the high-pressure, high-temperature, superheated vapor refrigerant to a re-heat coil 266. In certain embodiments, the re-heat coil 266 is positioned adjacent to the evaporator coil 130. In some embodiments, the re-heat coil 266 can be positioned in a supply duct 256 downwind from the evaporator coil 130. The re-heat coil 266 facilitates transfer of a portion of the heat stored in the high-pressure, high-temperature, super-heated vapor refrigerant to air moving through the supply duct 256 thereby heating the air in the supply duct 256. If the high-pressure, high-temperature, superheated vapor refrigerant is warmer, more heat can be transferred to the air in the supply duct 256 thereby causing a temperature of the air in the supply duct 256 to be closer to a temperature of air in a return duct 254. After leaving the re-heat coil 266, the high-pressure, high-temperature, superheated vapor refrigerant travels through a re-heat return line 270 and enters the condenser coil 142.

Outside air is circulated around the condenser coil 142 by a variable-speed condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

Figure 2B:
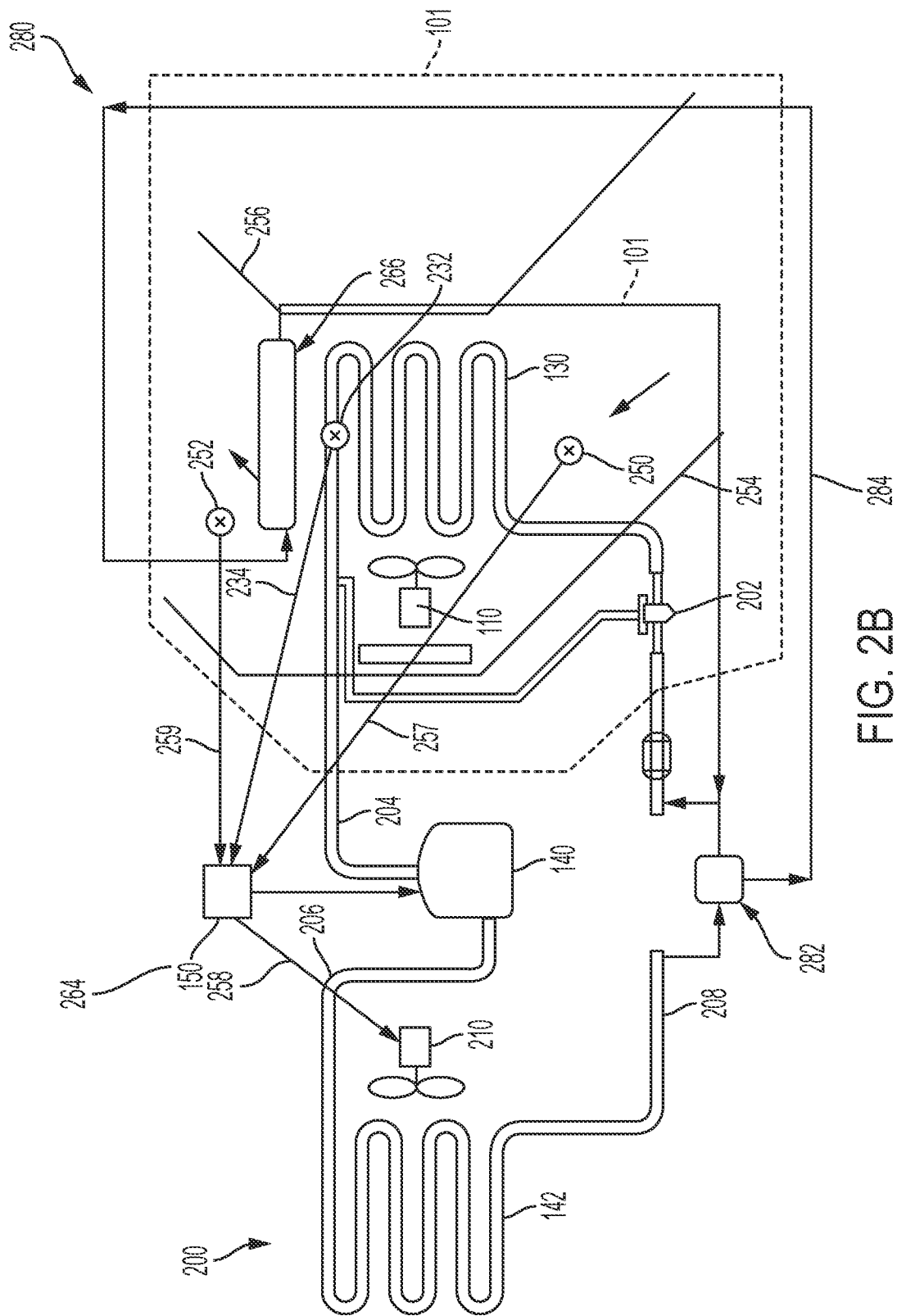
FIG. 2B is a schematic diagram of a split HVAC system having a re-heat loop.

FIG. 2B is a schematic diagram of a split HVAC system 200' having a re-heat loop 280. The split HVAC system 200' is similar in operation and construction to the package HVAC system 200. In the split HVAC system 200', the high-pressure, high-temperature, saturated liquid refrigerant leaves the condenser coil 142 via the liquid line 208 and enters a three-way valve 282 where a portion of the high-pressure, high-temperature, saturated liquid refrigerant is diverted into a re-heat feed line 284. The re-heat feed line 284 directs the high-pressure, high-temperature, saturated liquid refrigerant to a re-heat coil 286. In certain embodiments, the re-heat coil 286 is positioned adjacent to the evaporator coil 130. In some embodiments, the re-heat coil 286 can be positioned in the supply duct 256 downwind from the evaporator coil 130. The re-heat coil 286 facilitates transfer of a portion of the heat stored in the high-pressure, high-temperature, saturated liquid refrigerant to air moving through the supply duct 256 thereby heating the air in the supply duct 256. If the high-pressure, high-temperature, saturated liquid refrigerant is warmer, more heat can be transferred to the air in the supply duct 256 thereby causing a temperature of the air in the supply duct 256 to be closer to a temperature of air in the return duct 254. After leaving the re-heat coil 286, the high-pressure, high-temperature, saturated liquid refrigerant travels through a re-heat return line 290 and enters the metering device 202.

Referring to FIGS. 2A-B collectively, a first temperature sensor 250 is disposed in a return duct 254 and a second temperature sensor 252 is disposed in a supply duct 256. In a typical embodiment, the first temperature sensor 250 and the second temperature sensor 252 are, for example, thermistors; however, in other embodiments, the first temperature sensor 250 and the second temperature sensor 252 may be thermocouples, thermometers, or other appropriate devices as dictated by design requirements. The first temperature sensor 250 measures a temperature of air moving through the return duct 254 and the second temperature sensor 252 measures a temperature of air moving through the supply duct 256.

The first temperature sensor 250 and the second temperature sensor 252 transmit signals to the HVAC controller 150 corresponding to air temperature values in the return duct 254 and the supply duct 256, respectively. The signals transmitted by the first temperature sensor 250 and the second temperature sensor 252 are illustrated by arrows 257 and 259, respectively. The first temperature sensor 250 and the second temperature sensor 252 may communicate with the HVAC controller 150 via, for example, a wired connection or a wireless connection.

An SST sensor 232 is disposed within or in relation to the evaporator coil 130. In various embodiments, the SST sensor 232 may be, for example, a thermocouple, a thermometer, a pressure transducer, a thermostat, a thermistor, or any other appropriate sensor for measuring SST. The SST sensor 232 measures SST and transmits the SST to the HVAC controller 150. In some embodiments, the SST sensor 232 may be disposed on an exterior surface of the evaporator coil 130 thereby using an evaporator coil 130 surface temperature as a proxy measurement for the SST. Communication between the SST sensor 232 and the HVAC controller 150 is illustrated by arrow 234. In a typical embodiment, the SST sensor 232 continuously measures the SST; however, in other embodiments, the SST sensor 232 measures the SST at periodic time intervals such as, for example, every five seconds. In a typical embodiment, the SST sensor 232 is electrically coupled to the HVAC controller 150 via a wired connection however, in other embodiments, the SST sensor 232 is connected to the HVAC controller 150 via a wireless connection. In certain embodiments in which the variable-speed compressor 140 is representative of multiple compressors, the SST sensor 232 can be representative of a plurality of such sensors. For example, a plurality of sensors similar to the SST sensor 232 may be positioned for measuring SST at different locations at or on the evaporator coil 130.

In various embodiments, the HVAC controller 150 can use the SST sensor 232 to modulate compressor speed, when deemed appropriate, to prevent evaporator coil freeze. In various embodiments, the HVAC controller 150 can monitor the SST sensor 232. When the SST is less than a minimum SST threshold, the HVAC controller can modulate the compressor speed in accordance with a configurable algorithm. Examples of modulating compressor speed in response to changes in SST will be described relative to FIGS. 5-9.

FIG. 3 illustrates an example implementation 300 involving multiple compressors. The implementation 300 includes compressors 340a, 340b, 340c and 340d that are operable to operate off of an evaporator coil 330 that includes multiple evaporator circuits 345. SST sensors 332a, 332b, 332c and 332d (collectively, SST sensors 332) are disposed in different locations in or on the evaporator coil 330 and are operable to measure SST. In general, the SST sensors 332 can each operate as described relative to the SST sensor 232 of FIGS. 2A-B. It should be appreciated that the number and arrangement of compressors, SST sensors, and evaporator circuits can be varied to suit a given implementation. For example, various implementations may include more or fewer than four compressors and/or more or fewer than four SST sensors.

Figure 4:
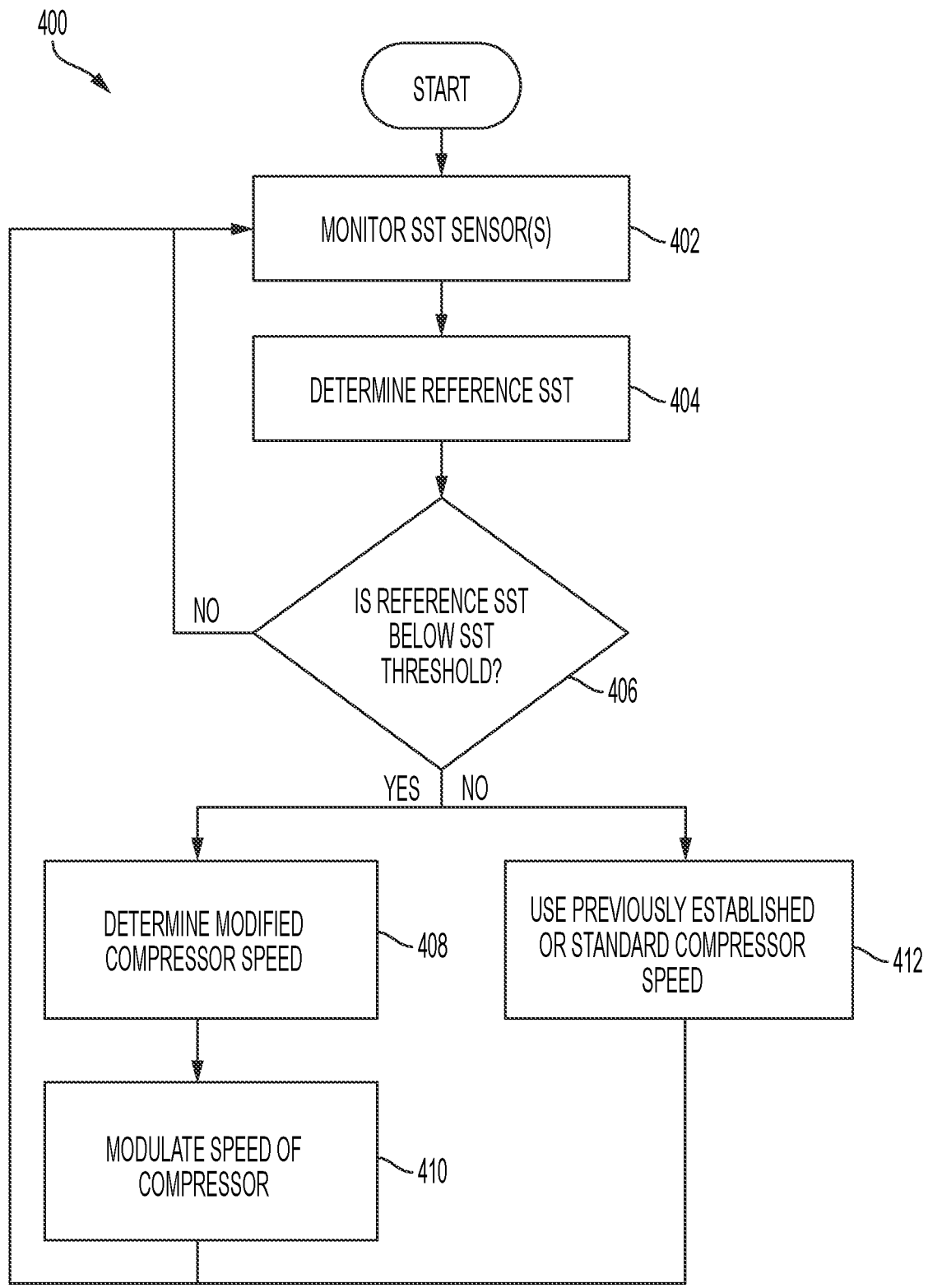
FIG. 4 is a flow diagram of a process for configurably modulating compressor speed during re-heat dehumidification mode.

FIG. 4 is a flow diagram of a process 400 for configurably modulating compressor speed during re-heat dehumidification mode to prevent evaporator coil freeze. In various embodiments, the process 400 only executes when a given HVAC system, such as the HVAC system 100 of FIG. 1, is operating in re-heat dehumidification mode. For illustrative purposes, the process 400 will be described relative to FIGS. 1, 2A-B and 3.

At block 402, the HVAC controller 150 monitors the SST sensor 232. As described previously, particularly with reference to FIG. 3, the SST sensor 232 can be representative of multiple SST sensors. In these embodiments, the monitoring can include monitoring, for example, multiple SST sensors similar to the SST sensors 332 of FIG. 3. As described previously, each SST sensor 232 periodically transmits SSTs to the HVAC controller 150.

At block 404, the HVAC controller 150 determines a reference SST ($SST_{REF}$) via each SST sensor 232. In general, $SST_{REF}$ can be any value deemed to represent SST for all or part of the evaporator coil 130. In various embodiments, $SST_{REF}$ can be a result of an automated analysis or computation using SSTs transmitted by each SST sensor 232. For example, block 404 can involve the HVAC controller 150 determining a plurality of SSTs (e.g., a most recent SST for each SST sensor 232) and determining a minimum SST of the plurality of SSTs, where the minimum SST serves as $SST_{REF}$. In embodiments in which the SST sensor 232 represents only a single SST sensor $SST_{REF}$ can be the most recent SST provided by that single SST sensor.

At decision block 406, the HVAC controller 150 determines whether $SST_{REF}$ is below a configurable minimum SST threshold ($SST_{Thresh}$). In various embodiments, $SST_{Thresh}$ can be set to a value that is configurably above an applicable freezing point. In various examples in which the applicable freezing point is 32° F., $SST_{Thresh}$ may be set to 33° F., 34° F., 36° F., 38° F. or any other suitable temperature. If it is determined at decision block 406 that $SST_{REF}$ is not below $SST_{Thresh}$, the process 400 proceeds to block 412.

At block 412, the HVAC controller 150 continues to use, or shifts to, a previously established or standard compressor speed ($CS_{STD}$). $CS_{STD}$ may correspond to a standard demand-based value that would otherwise be used, for example, in re-heat dehumidification mode in the absence of the process 400. In various cases, if, for example, the HVAC controller 150 had previously been using a modified compressor speed, block 412 can include modulating a speed of the variable-speed compressor 140 in correspondence to the standard demand-based value. From block 412, the process 400 returns to the block 402 and executes as described previously.

If it is determined at the decision block 406 that $SST_{REF}$ is below $SST_{Thresh}$, the process 400 proceeds to block 408. At block 408, the HVAC controller 150 determines a modified compressor speed ($CS_{MOD}$) based on $SST_{REF}$. In some embodiments, $CS_{MOD}$ can vary with $SST_{REF}$ between a minimum value ($CS_{MIN}$) and $CS_{STD}$. In a typical embodiment, if $SST_{REF}$ is decreasing and a current compressor speed is greater than $CS_{MIN}$, block 408 will amount to decreasing the compressor speed. Conversely, in a typical embodiment, if $SST_{REF}$ is increasing, although remaining below $SST_{Thresh}$, block 408 will amount to increasing the compressor speed. In this fashion, the HVAC controller 150 can determine a modified compressor speed in each iteration through the block 408 in response to a then-existing $SST_{REF}$. At block 410, the HVAC controller 150 modulates a speed of the variable-speed compressor 140 in correspondence to $CS_{MOD}$. After block 410, the process 400 returns to block 402 and executes as described previously. In various embodiments, the process 400 can continue to execute until terminated by a user or administrator or until other suitable stop criteria is satisfied.

Equation 1 below provides an example of how $CS_{MOD}$ may be determined, for example, during the block 408 of the process 400 of FIG. 4. In the example of Equation 1, $CS_{MOD}$ varies linearly with $SST_{REF}$ between $CS_{MIN}$ and $CS_{STD}$, where $SST_{LIM}$ represents a suitable value that is configurably close to an applicable freezing point such as, for example, 32° F. In certain embodiments, with reference to the process 400 of FIG. 4, all compressor speeds may be expressed as percentages of an applicable maximum speed. According to this example, $CS_{STD}$ can equal any suitable percentage representative of re-heat compressor demand such as, for example, 60, 80, 100 or the like. Similarly, $CS_{MIN}$ can represent any suitable percentage that is less than $CS_{STD}$ such as, for example, 30, 40, 50, 60 or the like.

$$CS_{MOD} = \text{MAX}\left[CS_{MIN}, \text{MIN}\left(CS_{STD}, CS_{MIN} + \frac{(CS_{STD} - CS_{MIN})}{(SST_{Thresh} - SST_{Lim})*(SST_{REF} - SST_{LIM})}\right)\right] \quad \text{Equation 1}$$

Although an example of a linear function is provided above for simplicity of description, one skilled in the art will appreciate that $CS_{MOD}$ can also vary non-linearly with $SST_{REF}$ between $CS_{MIN}$ and $CS_{STD}$. For example, $CS_{MOD}$ can be established using a polynomial function. Non-linear variation, such as by way of a polynomial function, can be advantageous to provide more significant and responsive change depending on a value of $SST_{REF}$. According to this example, in cases where compressor speed is being algorithmically decreased as described previously, relatively lower values of $SST_{REF}$ (e.g., values close to an applicable freezing point) can result in a steeper decrease to $CS_{MOD}$ than relatively higher values according to a polynomial curve. Similarly, in cases where compressor speed is being algorithmically increased as described previously, relatively higher values of $SST_{REF}$ (e.g., values closer to $SST_{Thresh}$) can result in a steeper increase to $CS_{MOD}$ than relatively lower values according to the polynomial curve.

In some embodiments, a process for configurably modifying compressor speed, such as the process 400 of FIG. 4, or portions thereof, may only be performed in particular modes of a given HVAC system. These modes generally have operational characteristics that lower SST and thus increase a risk of evaporator coil freeze. For example, with reference to the HVAC system 100 of FIG. 1, the process 400 may only be performed when the HVAC system 100 is in re-heat dehumidification mode. In addition, or alternatively, in certain embodiments, some portions of the process 400 may be performed in all modes of the HVAC system 100 (e.g., blocks 402-404), while functionality to modify compressor speed (e.g., blocks 406-412) may only be performed in re-heat dehumidification mode of the HVAC system 100. Other variations and potential preconditions will be apparent to one skilled in the art after a detailed review of the present disclosure.

Figure 5:
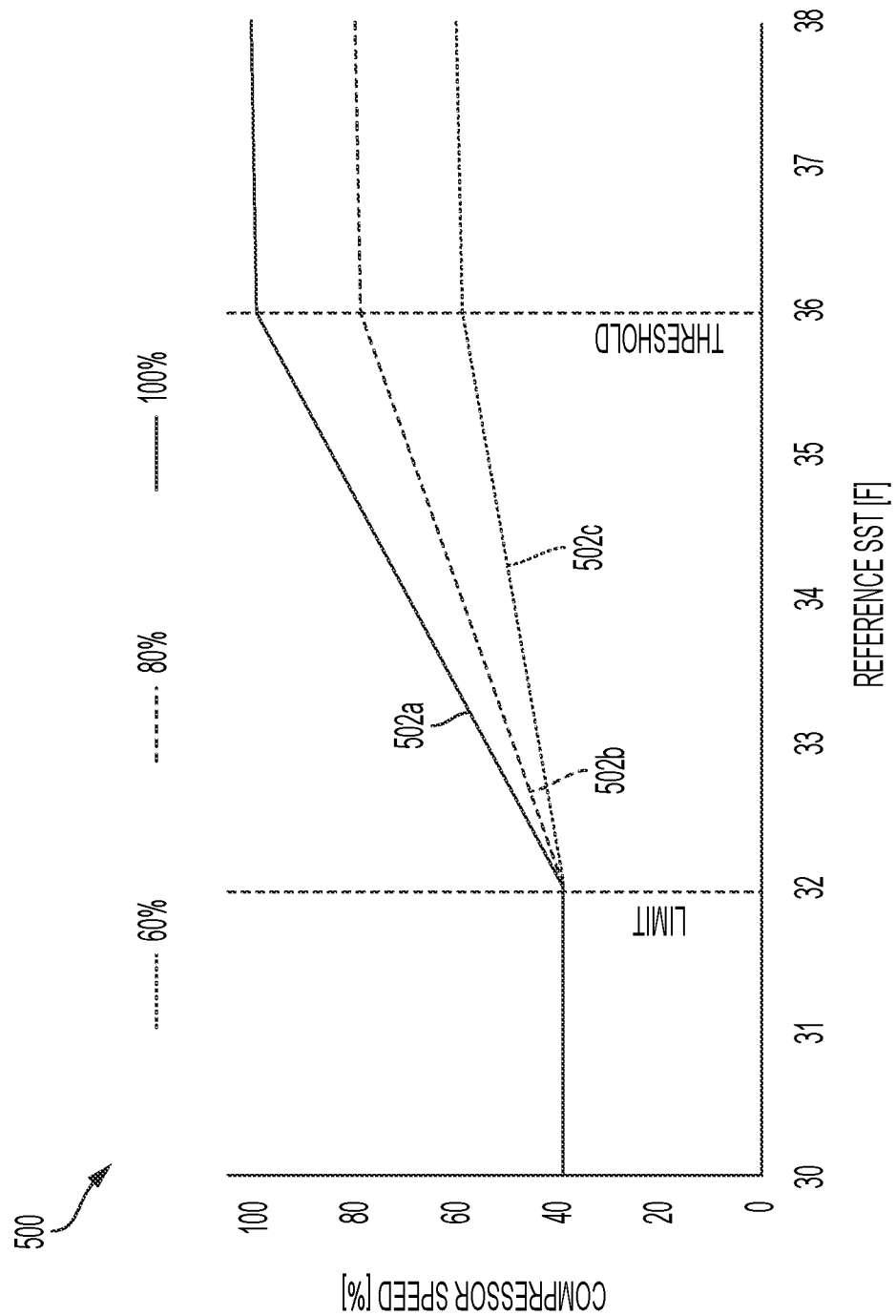
FIG. 5 is a graph that shows example variation in modified compressor speeds.

FIG. 5 is a graph 500 that shows example variation in compressor speeds 502a, 502b and 502c (collectively, compressor speeds 502) for three different $CS_{STD}$ values of 60, 80 and 100 percent, respectively. In the example of FIG. 5, $SST_{Thresh}$ set to approximately 36° F. and $SST_{LIM}$ is set to approximately 32° F. When $SST_{REF}$ is below $SST_{Thresh}$, the compressor speeds 502 each correspond to a $CS_{MOD}$ according to Equation 1 above, thereby varying linearly with $SST_{REF}$ between $CS_{MIN}$ and a respective $CS_{STD}$. Otherwise, when $SST_{REF}$ is not below $SST_{Thresh}$, the compressor speeds 502 each correspond to their respective $CS_{STD}$.

Figure 6:
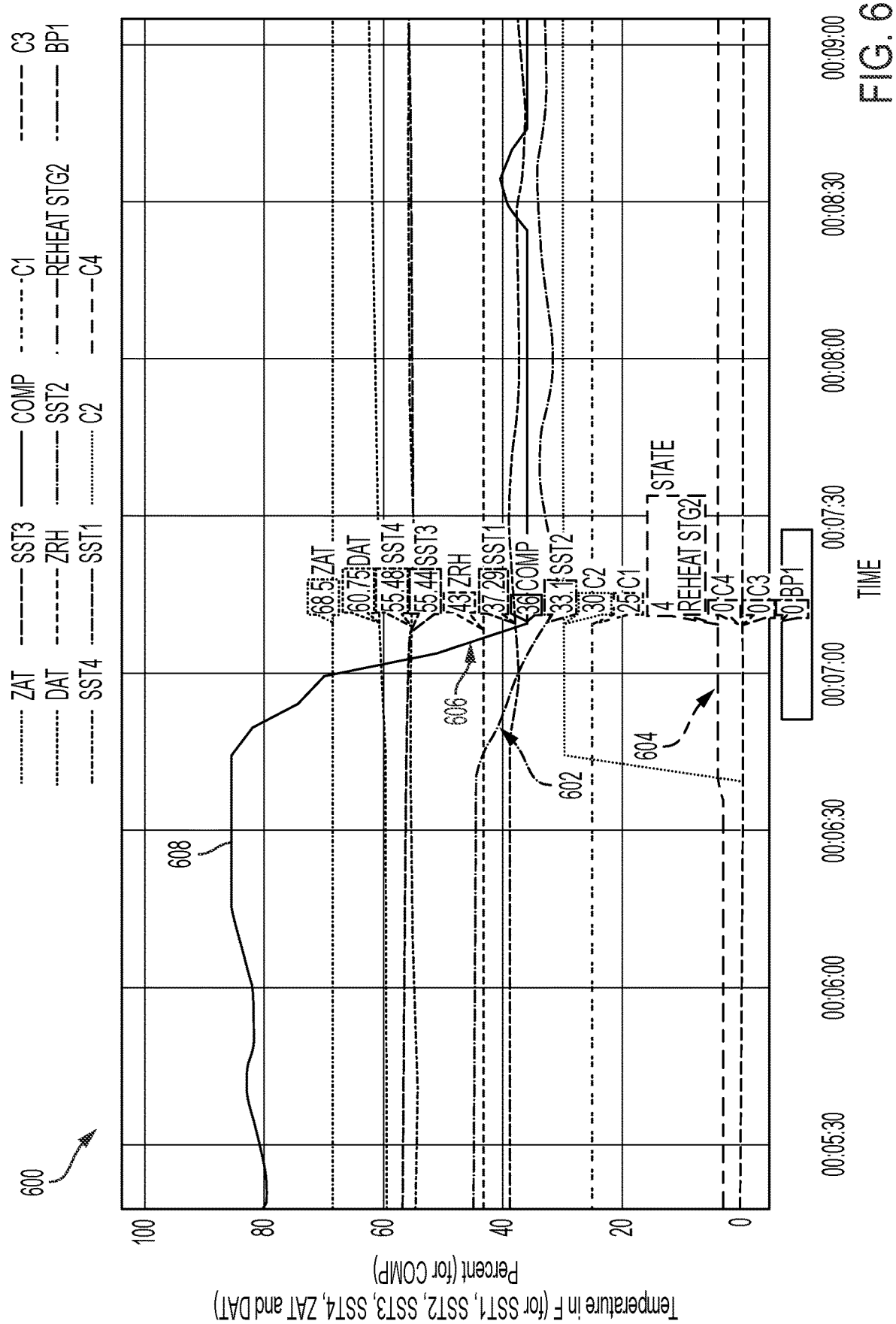
FIG. 6 is a graph that illustrates example compressor-speed modulation for an example multi-compressor HVAC system.

FIG. 6 is a graph 600 that illustrates example compressor-speed modulation for an example multi-compressor HVAC system. In the example of FIG. 6, compressor C1 is a variable-speed compressor similar to the variable-speed compressor 140 of FIG. The graph 600 shows that a stage-2 re-heat dehumidification mode is entered between 06:30 and 07:00. Arrows 602, 604 and 606 indicate that, as SST2 falls below $SST_{Thresh}$ (i.e., 36° F. In this example), the example multi-compressor HVAC system remains in stage-2 re-heat dehumidification mode and a compressor speed 608 of the compressor C1 is algorithmically decreased in the fashion described above. SST2 thereafter stabilizes in response to the decrease in the compressor speed 608.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (MID), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the HVAC controller 150, one or more portions of the user interface 170, one or more portions of the zone controller 180, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of preventing evaporator coil freeze in a heating, ventilation and air conditioning (HVAC) system, the method comprising, by a controller in the HVAC system:
   determining a reference saturated suction temperate (SST) via a sensor disposed in relation to an evaporator coil in the HVAC system, wherein the HVAC system is operating in re-heat dehumidification mode, wherein the determining the reference SST comprises determining a plurality of SSTs via a plurality of sensors disposed in relation to the evaporator coil and determining a minimum SST of the plurality of SSTs, wherein the minimum SST is the reference SST;
   determining whether the reference SST is below a minimum SST threshold;
   responsive to a determination that the reference SST is below the minimum SST threshold, determining a decreased compressor speed;
   modulating a variable-speed compressor in the HVAC system in correspondence to the decreased compressor speed; and
   wherein the evaporator coil comprises a plurality of evaporator circuits apportioned to a plurality of compressors in the HVAC system, the plurality of sensors comprising at least one sensor disposed in relation to each of the plurality of evaporator circuits.

2. The method of claim 1, wherein the decreased compressor speed varies linearly with the reference SST between a first value and a second value.

3. The method of claim 2, wherein the first value comprises a minimum value and the second value comprises a pre-established value based on re-heat compressor demand.

4. The method of claim 1, wherein the decreased compressor speed varies non-linearly with the reference SST between a first value and a second value.

5. The method of claim 1, comprising:
   determining whether the HVAC system is in re-heat dehumidification mode; and
   wherein the determining the reference SST is performed responsive to a determination that the HVAC system is in re-heat dehumidification mode.

6. The method of claim 1, comprising:
   determining whether the HVAC system is in re-heat dehumidification mode; and
   wherein the determining whether the reference SST is below the minimum SST threshold is performed responsive to a determination that the HVAC system is in re-heat dehumidification mode.

7. The method of claim 1, comprising:
   determining a second reference SST via the sensor;
   determining a modified compressor speed; and
   modulating the variable-speed compressor in correspondence to the modified compressor speed.

8. The method of claim 1, comprising:
   determining a second reference SST via the sensor;
   determining whether the second reference SST is below the minimum SST threshold; and
   responsive to a determination that the second reference SST is not below the minimum SST threshold, modulating the variable-speed compressor in correspondence to a standard demand-based value for the re-heat dehumidification mode.

9. A heating, ventilation, and air conditioning (HVAC) system comprising:
   an evaporator coil;
   a re-heat coil;
   a condenser coil;
   a sensor disposed in relation to the evaporator coil;
   a compressor fluidly coupled to the condenser coil, the evaporator coil and the re-heat coil; and
   a controller operatively coupled to the compressor, wherein the controller is operable to perform a method comprising:
      determining a reference saturated suction temperate (SST) via the sensor, wherein the HVAC system is operating in re-heat dehumidification mode, wherein the determining the reference SST comprises determining a plurality of SSTs via a plurality of sensors disposed in relation to the evaporator coil and determining a minimum SST of the plurality of SSTs, wherein the minimum SST is the reference SST;
      determining whether the reference SST is below a minimum SST threshold; and
      responsive to a determination that the reference SST is below the minimum SST threshold, determining a decreased compressor speed;
      modulating a variable-speed compressor in the HVAC system in correspondence to the decreased compressor speed; and
   wherein the evaporator coil comprises a plurality of evaporator circuits apportioned to a plurality of compressors in the HVAC system, the plurality of sensors comprising at least one sensor disposed in relation to each of the plurality of evaporator circuits.

10. The HVAC system of claim 9, the method comprising:
    determining whether the HVAC system is in re-heat dehumidification mode; and
    wherein the determining whether the reference SST is below the minimum SST threshold is performed responsive to a determination that the HVAC system is in re-heat dehumidification mode.

11. The HVAC system of claim 9, the method comprising:
determining a second reference SST via the sensor;
determining whether the second reference SST is below the minimum SST threshold; and
responsive to a determination that the second reference SST is not below the minimum SST threshold, modulating the variable-speed compressor in correspondence to a standard demand-based value for the re-heat dehumidification mode.

12. The HVAC system of claim 9, wherein the decreased compressor speed varies linearly with the reference SST between a first value and a second value.

13. The HVAC system of claim 12, wherein the first value comprises a minimum value and the second value comprises a pre-established value based on re-heat compressor demand.

14. The HVAC system of claim 12, wherein the decreased compressor speed varies non-linearly with the reference SST between a first value and a second value.

15. The HVAC system of claim 9, the method comprising:
determining a second reference SST via the sensor;
determining a modified compressor speed; and
modulating the variable-speed compressor in correspondence to the modified compressor speed.

16. A computer-program product comprising a non-transitory computer-usable medium having computer-readable program code embodied therein, the computer-readable program code adapted to be executed to implement a method of preventing evaporator coil freeze in a heating, ventilation and air conditioning (HVAC) system:
determining a reference saturated suction temperate (SST) via a sensor disposed in relation to an evaporator coil in the HVAC system, wherein the HVAC system is operating in re-heat dehumidification mode, wherein the determining the reference SST comprises determining a plurality of SSTs via a plurality of sensors disposed in relation to the evaporator coil and determining a minimum SST of the plurality of SSTs, wherein the minimum SST is the reference SST;
determining whether the reference SST is below a minimum SST threshold;
responsive to a determination that the reference SST is below the minimum SST threshold, determining a decreased compressor speed;
modulating a variable-speed compressor in the HVAC system in correspondence to the decreased compressor speed; and
wherein the evaporator coil comprises a plurality of evaporator circuits apportioned to a plurality of compressors in the HVAC system, the plurality of sensors comprising at least one sensor disposed in relation to each of the plurality of evaporator circuits.

* * * * *

UNITED STATES PATENT AND TRADEMARK OFFICE
CERTIFICATE OF CORRECTION

| | |
|---|---|
| PATENT NO. | : 11,561,015 B2 |
| APPLICATION NO. | : 17/181174 |
| DATED | : January 24, 2023 |
| INVENTOR(S) | : Rakesh Goel et al. |

It is certified that error appears in the above-identified patent and that said Letters Patent is hereby corrected as shown below:

In the Specification

Column 5, Line 57    Replace "it but typically" with
-- illustrated but typically --

Column 7, Line 57    Replace "is not pail of the" with
-- is not part of the --

Column 14, Line 11   Replace "(MID)" with
-- (HHD) --

Signed and Sealed this
Eleventh Day of April, 2023

Katherine Kelly Vidal
*Director of the United States Patent and Trademark Office*